United States Patent [19]

Kubala

[11] Patent Number: 5,617,879
[45] Date of Patent: Apr. 8, 1997

[54] SEALING ARRANGEMENT FOR A COOLANT UNION HAVING A FLOATING SEAL ASSEMBLY

[75] Inventor: Zbigniew Kubala, Waukegan, Ill.

[73] Assignee: Deublin Company, Waukegan, Ill.

[21] Appl. No.: 390,490

[22] Filed: Feb. 17, 1995

[51] Int. Cl.⁶ ............... F16L 17/06; F16L 33/16
[52] U.S. Cl. .............. 285/95; 285/98; 285/113; 285/348; 285/918; 277/176; 277/188 A
[58] Field of Search .................. 285/95, 96, 98, 285/100, 108, 113, 277, 348, 918; 277/165, 173, 175, 188 A

[56] References Cited

U.S. PATENT DOCUMENTS

| | | | |
|---|---|---|---|
| 2,420,104 | 5/1947 | Smith | 277/176 |
| 3,427,051 | 2/1969 | White et al. | 285/348 X |
| 3,455,566 | 7/1969 | Huil et al. | 277/176 |
| 4,681,327 | 7/1987 | d'Agostino et al. | 277/165 X |
| 5,071,318 | 12/1991 | Bice et al. | 277/188 A |

FOREIGN PATENT DOCUMENTS 923013   4/1963   United Kingdom .............. 277/176

*Primary Examiner*—Randolph A. Reese
*Assistant Examiner*—Heather Shackelford
*Attorney, Agent, or Firm*—Emrich & Dithmar

[57] ABSTRACT

A sealing arrangement for a rotating coolant union for preventing leakage forward between the outer surface of a seal carrier of a floating seal assembly of the coolant union and the inner wall of the housing, includes an O-ring seal and an annular back-up ring. The O-ring is mounted on the seal carrier and extends into an annular groove defined in the inner surface of the housing, with the width of the groove being greater than the outer diameter of the O-ring seal to permit the O-ring seal to be moved within groove in response to axial sliding movement of the seal carrier. The back-up ring encircles the support member and includes a radially projecting portion that extends into the groove and defines a slanting surface for a corner of the groove, the slanting surface being engaged by the O-ring seal during relative axial movement between the seal carrier and housing for limiting movement of the seal within the groove.

15 Claims, 2 Drawing Sheets

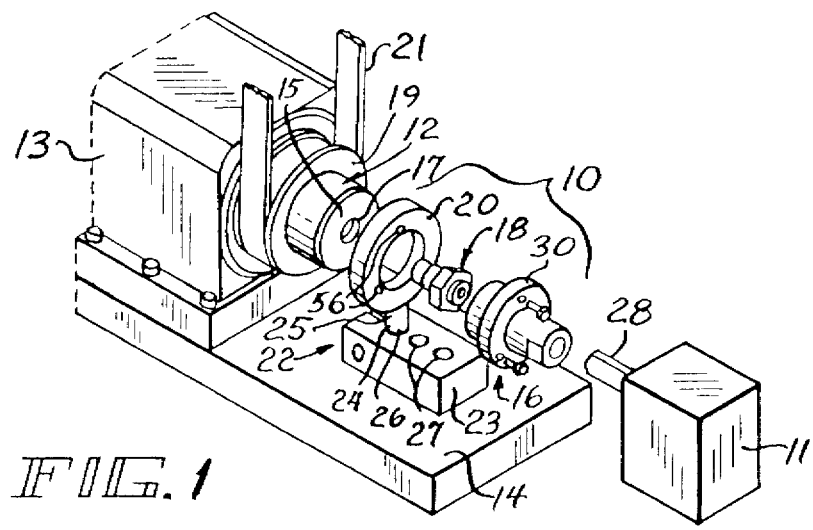
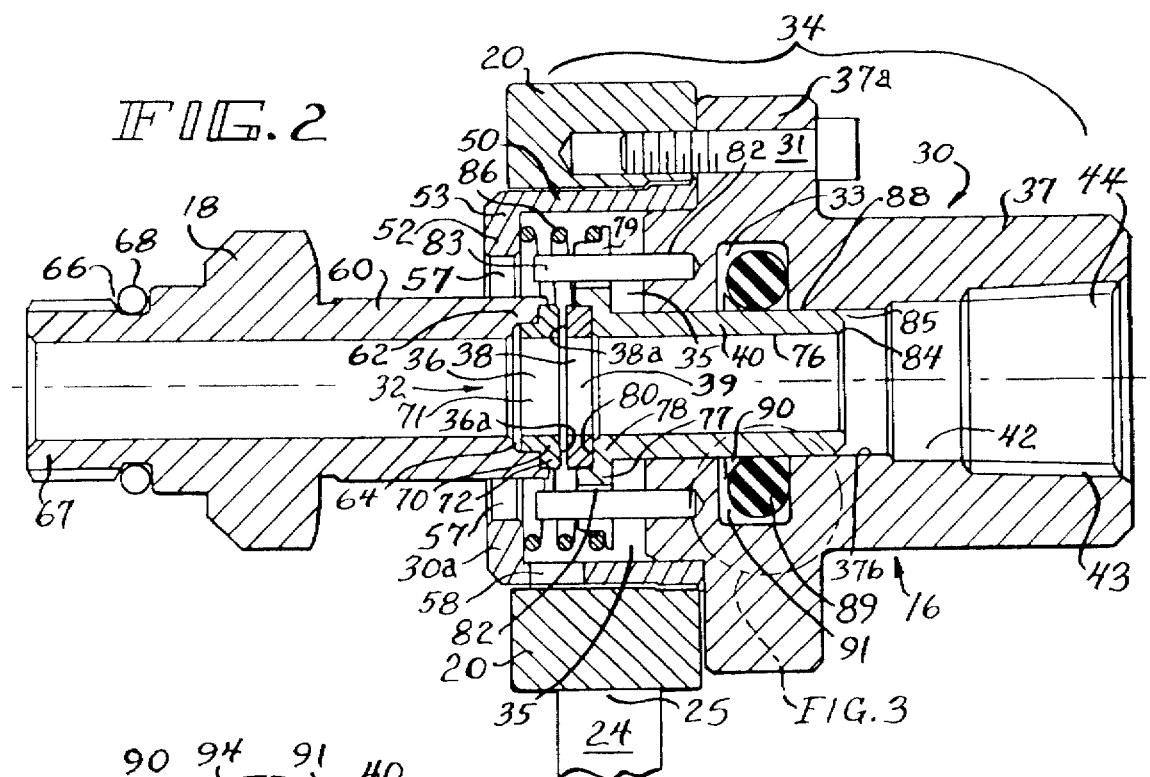
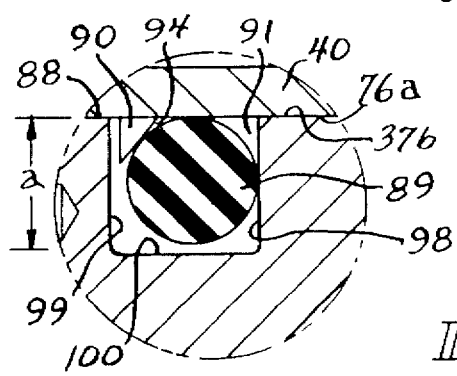

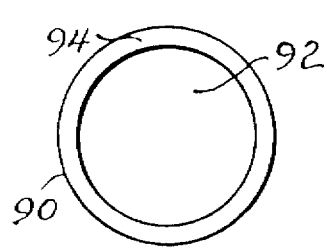
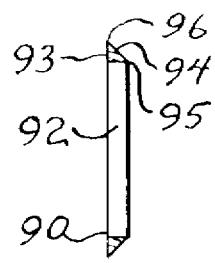
FIG. 4    FIG. 5
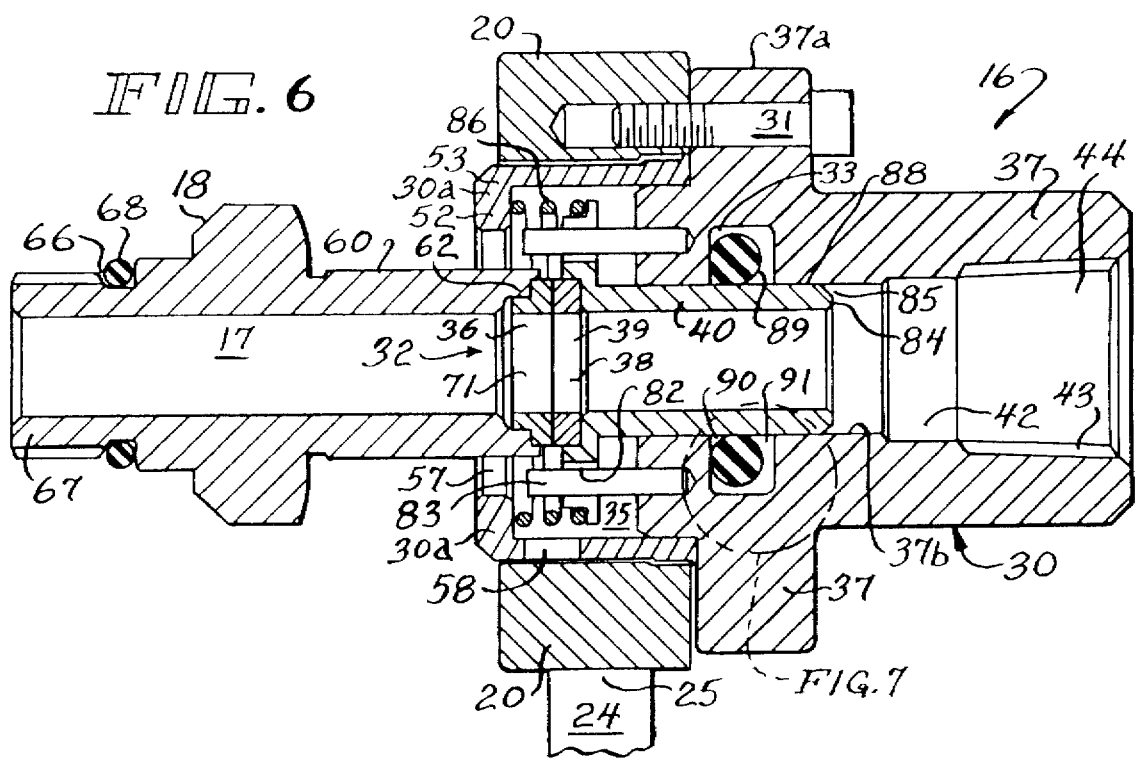
FIG. 6
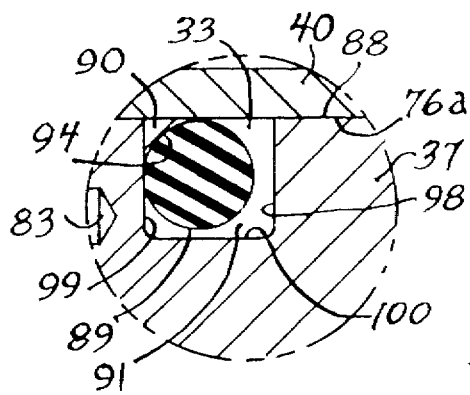
FIG. 7

5,617,879

SEALING ARRANGEMENT FOR A COOLANT UNION HAVING A FLOATING SEAL ASSEMBLY

BACKGROUND OF THE INVENTION

This invention relates to fluid coupling devices such as coolant unions, and more particularly, to an improved sealing arrangement for coolant unions of the type having a seal assembly including an axially movable seal member.

Fluid coupling devices such as rotating unions are used extensively in high speed drilling and boring transfer operations, in high speed machine tool spindles, in clutch and brake operations, and in other applications where it is necessary to couple the outlet of fluid sources to rotating devices. In high speed drilling apparatus, for example, rotating unions are used to conduct a liquid, such as a water based coolant, from a source of coolant to a rotating drill bit. Rotating coolant unions include a sealing assembly which provides the interface between the outlet of the fluid source which is fixed and the rotating device to which coolant is being supplied. The seal assembly includes a rotating seal member that is mounted on the rotor of the rotating union and a non-rotating seal member that is mounted within the housing of the coolant union. The seal surface of the non-rotating seal member is biased into fluid tight engagement with the seal surface of the rotating seal, typically by a bias spring arrangement. The liquid coolant passing through the coolant union lubricates the seal members to minimize wear. However, when coolant fluid is not provided, a condition referred to in the art to as "dry running", the interfacing surfaces of the seal members do not receive lubrication. Dry running results in increased wear on the seal surfaces of the seal members, particularly at high speed operation. Extended dry run operation will cause scoring of the seal faces, particularly the seal face of the rotating seal member, resulting in leakage around the seal faces which will require replacement of one or both of the seal members. Because the rotating seal member is either permanently attached to the rotor or is integrally formed with the rotor, replacement of a damaged or scored rotating seal member usually requires replacement of the entire rotor assembly.

To solve seal wear problems associated with dry running, rotating coolant unions have been developed in which the rotating seal member is automatically disengaged from the non-rotating seal member in the absence of liquid coolant. Such coolant unions are commonly referred to as "pop-off" unions because the fixed seal member is moved axially relative to the housing of the coolant union out of engagement with the rotating seal member when coolant flow pressure decreases below a selected or predetermined value. The non-rotating seal member is mounted on a carrier that is adapted to be moved to carry the seal member into engagement with the rotating seal member when coolant flow pressure is increased to the selected value.

Because "pop-off" type unions require axial movement of one seal member along the inner surface of the housing of the union, sealing must be provided to prevent leakage forwardly past the axially movable seal member through the gap between the seal member carrier and the housing inner surface on which it slides. In one type of rotating coolant union, such sealing is provided by an O-ring seal, located in an annular groove in the inner surface of the housing, which engages the outer surface of the carrier for the non-rotating seal member about its circumference. However, because the O-ring seal is fixed in an annular groove in the housing, as the carrier axially moves the non-rotating seal member into and out of engagement with the rotating seal member, the seal is dragged along the outer surface of the carrier. The resultant wear on the O-ring seal will cause the O-ring seal to fail, permitting forward flow of the liquid coolant from the inlet of the union into the interior of the housing.

Another example of a "pop-off" type coolant union including a fluid actuated seal assembly is disclosed in U.S. Pat. No. 4,976,282 which was issued to Zbigniew Kubala and which is assigned to Deublin Company of Northbrook, Ill. This coolant union includes a diaphragm in the fluid path for driving the non-rotating seal member into engagement with the rotating seal member when liquid coolant is being supplied to the coolant union. A bias mechanism drives the seal members apart in the absence of liquid coolant. When sufficient coolant pressure is provided, fluid pressure on the diaphragm causes the diaphragm to move the seal member carrier axially to drive the non-rotating seal member into engagement with the rotating seal member. In this coolant union, the diaphragm provides sealing against coolant leakage forwardly of the housing. However, the use of the diaphragm for actuating the seal assembly increases the cost and the complexity of such coolant unions.

SUMMARY OF THE INVENTION

The present invention provides a novel sealing arrangement for a fluid coupling device for substantially preventing leakage forward between a portion of a seal assembly of the coupling device that is adapted for axial sliding movement within a passageway of a housing of the coupling device and the inner wall of the housing along which the portion of the seal assembly slides. The sealing arrangement includes an annular seal member and a back-up ring. The annular seal member is located in an annular groove defined in the inner wall of the housing and engages an outer surface of the movable portion of the seal assembly. In accordance with a feature of the present invention, the annular seal member is sized to be smaller than the annular groove, allowing limited movement of the seal member within the groove. A back-up ring is provided and encircles the moving seal assembly and extends into the annular groove in the inner wall of the housing. The back-up ring is oriented within the groove to provide a slanting surface for a corner of groove and facing the seal member. The slanting surface is engaged by the seal member during axial movement of the movable portion of the seal assembly, limiting movement of the seal member within the groove. Consequently, the seal member is not dragged along the surface of the moving seal assembly or sliding support member into the gap between the inner wall of the housing and the outer surface of the moving seal assembly so that wear on the seal member is minimized, increasing the lifetime of the seal member.

The sealing arrangement provided by the present invention is particularly suitable for application to rotating unions having a fluid actuated seal assembly in which the floating seal assembly, which is located within the housing of the union, provides a rotating seal between a fluid inlet of the union and a discharge passageway of the rotor. The floating seal assembly includes a rotating seal and a non-rotating seal member located in the inlet chamber opposing the rotating seal member. A support member supports the non-rotating seal member for movement within the inlet chamber axially of the housing between a first position in which the non-rotating seal member is spaced apart from the rotating seal member and a second position in which the seal surface of the non-rotating seal member engages the seal surface of the rotating seal member. The floating seal assembly is adapted to be actuated by fluid introduced into the inlet chamber for acting upon the non-rotating seal member to maintain it at the first position in the absence of a selected fluid flow pressure in the inlet chamber and to move the non-rotating seal to a second position and maintain it in the second position as long as fluid flow pressure is provided. In such application, the sealing arrangement substantially prevents leakage forward between the engaging surfaces of the housing and the carrier that moves the non-rotating seal member into and out of engagement with the rotating seal member.

Additionally, in accordance with the present invention the annular seal member or O-ring is structurally arranged to sealingly engage the outer annular surface of the movable portion of the seal assembly and to float within the annular groove provided in the inner wall of the housing. Thus, as thermal expansion of the spindle or shaft occurs during running of the rotating coolant union, this thermal expansion effects the preset opening distance between the rotating and non-rotating seal faces. Under such conditions, the O-ring never rolls on the movable portion of the seal assembly but instead is allowed to slide or float therealong within the annular groove to provide an automatic adjustment for spindle expansion to maintain the preset opening distance and avoid contact during a dry running condition.

The present invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purposes of facilitating and understanding the present invention, there is illustrated in the accompanying drawings a preferred embodiment thereof, from an inspection of which, when considered in connection with the following description, the invention, its construction and operation, and many of its advantages will be readily understood and appreciated.

FIG. 1 illustrates a rotating coolant union, shown partially exploded, incorporating the improved sealing arrangement in accordance with by the present invention, the coolant union being externally supported in operative relation with a rotating shaft of an apparatus for coupling the outlet of a coolant source to the rotating shaft;

FIG. 2 is a vertical section view of the rotating coolant union provided in accordance with the present invention, with the coolant union shown in its unoperated, unpressurized condition;

FIG. 3 is an enlarged view of the portion of the rotating coolant union shown in the circle in FIG. 2, illustrating the relationship between the O-ring seal and the back-up ring when the rotating coolant union is in its unoperated, unpressurized condition;

FIG. 4 is a plan view of the back-up ring of the rotating coolant union in accordance with the present invention;

FIG. 5 is a side view of the back-up ring of the rotating coolant union in accordance with the present invention;

FIG. 6 is a view similar to FIG. 2 showing the rotating coolant union in its operated, pressurized condition in accordance with the present invention; and FIG. 7 is a view similar to FIG. 3 showing the relationship between the O-ring seal and the back-up ring when the rotating coolant union is in its operated, pressurized condition.

DESCRIPTION OF THE PREFERRED EMBODIMENT

Referring to FIG. 1 of the drawings, there is illustrated a rotating coolant union 10 incorporating the improved sealing arrangement provided by the present invention. The rotating coolant union 10, shown partially exploded in FIG. 1, is used to conduct a coolant, in liquid state, from a source of coolant 11 to a drive shaft 12 of a device, such as a rotating drill bit (not shown) to which liquid coolant is to be supplied. The rotating coolant union 10 interfaces the outlet of the source of coolant 11 and the shaft 12 to which the rotating device is connected. The shaft 12 is supported in a spindle box 13 which is fixedly mounted on a support plate 14. The driven end 15 of the shaft 12 extends out of the spindle box 13. The shaft 12 has a bore 17 formed therethrough for conducting the coolant to the rotating device. The driven end of the shaft 12 carries a pulley 19 which facilitates rotation of the shaft by a motor driven belt 21.

The rotating coolant union 10 includes a cartridge union 16, a stub rotor 18 and a union adapter 20. The stub rotor 18 is connected to the rotating shaft 12 which is to receive coolant fluid through the coolant union. The stub rotor 18 is driven by the driving element to which it is coupled and is revolving at a rate determined by the driving element of up to 20,000 RPM.

In the exemplary embodiment, the rotary union 10 is externally supported, the stub rotor 18 being mounted onto the end of the shaft 12, and the cartridge union 16 being rigidly mounted by means of the union adapter 20 to the support plate 14. The support plate 14 defines a stationary mounting surface for permitting the cartridge union 16 to be maintained in axial alignment with the stub rotor 18, allowing precise engagement of seal faces of a non-rotating seal member and a rotating seal member of the rotating union, as will be shown. A base mount clamp assembly 22, including a mounting base 23 and a mounting post 24, mounts the union adapter 20 to the support plate. The mounting base 23 is affixed to the support plate 14. The union adapter 20 has a tapped hole (not shown) on its lower surface which receives one end 25 (FIG. 2) of the mounting post 24. The other end 26 of the mounting post is received in one of a plurality of tapped holes 27 formed in the upper surface of the mounting base 23. The plurality of mounting holes 27 in the mounting base 23 enable the base mount clamp assembly 22 to accommodate rotating unions of different sizes and dimensions.

The mounting arrangement illustrated in FIG. 1 is a standard base mount configuration in which the union adapter 20 is held by the base mount clamp assembly 22. Alternatively, the rotary coolant union can be top supported or the rotary coolant union can be self-supporting as is known in the art. In a top supported mounting arrangement, the union adapter is suspended from a clamping mechanism mounted to the upper surface of the spindle box, for maintaining the union cartridge in axial alignment with the stub rotor. Self-supporting unions include a bearing mechanism, such as one or more roller bearings, for supporting and aligning the stub rotor 18 relative to the housing of the coolant union to maintain the rotating seal member aligned axially with the non-rotating seal member.

Referring now to FIGS. 1 and 2, the cartridge union 16 includes an end cap 30, a floating seal assembly 32 and the sealing arrangement 33 provided by the present invention. The end cap 30 and the union adapter 20 form a cylindrical housing for the rotating union, the housing being given the reference numeral 34. The interior of the housing 34 defines a seal chamber 35 which locates the floating seal assembly 32.

The end cap 30 has a sidewall 37 with an annular mounting flange 37a by which the end cap is secured to the union adapter 20 by suitable fasteners, such as cap screws 31, as will hereinafter be described. The end cap 30 has a cylindrical bore 42 which defines a passageway that extends axially of the end cap and which defines a fluid inlet 44 which is in line with the passageway. The fluid inlet 44 is adapted for connection to a supply conduit 28, shown in FIG. 1, for connecting with the outlet of the source 11 of liquid coolant. The inner surface 43 of the portion of the end cap that defines the fluid inlet 44 can be internally threaded to facilitate connection to the supply conduit 28, shown in FIG. 1. Although the exemplary coolant union is a straight coolant union having the axis of the fluid inlet 44 aligned with the axis of the throughbore or passageway 42, the fluid inlet 44 may be oriented at a right angle to the throughbore, conventionally referred to as a 90° union.

The end cap 30 includes a cup-shaped adapter member 30a press fitted to its forward end. The cup-shaped member 30a includes a cylindrical side wall portion 50 with an end wall 52 at one end 53. The donut-shaped union adapter 20 is adapted to receive the adapter member 30a and includes tapped apertures 56, shown in FIGS. 1 and 2, to facilitate connecting the union adapter 20 to the end cap 30 by means of the cap screws 31. The adapter member 30a has an axial opening 57 in its end wall 52 for the stub rotor 18 to pass through. The adapter member 30a has three vent holes, such as vent hole 58, formed through the sidewall 50 thereof adjacent to the seal chamber 35 and spaced apart equidistantly around the circumference of the adapter member 30a. These vent holes enable liquid coolant to be conducted from the seal chamber 35 to the outside of the union housing when the seal provided by the mating sealing members begins to wear. Such liquid coolant leakage provides an early indication of seal wear and prevents fluid build up within the seal compartment. In the exemplary embodiment, the adapter member 30a is made of aluminum.

The stub rotor 18 has a steel barrel 60, one end 62 of which is formed with a cavity 64. The stub rotor 18 has a circumferential groove 66 near its opposite end 67 which locates a VITON O-ring seal 68 for providing sealing between the stub rotor 18 and the inner surface of the shaft 12.

Considering the floating seal assembly 32 in more detail, the rotating seal member 36 is a one-piece member made of silicon carbide. The rotating seal member 36 includes a generally flat, disc-shaped seal portion 70 with an opening 71 through the center thereof, defining an annular seal surface 36a and a cylindrical mounting portion 72. The rotating seal member is mounted on the stub rotor 18 with its mounting portion 72 received in the cavity 64 formed in end 62 of the barrel 60 of the stub rotor 18. The seal member 36 is secured to the stub rotor 18 in a suitable manner, as is known in the art.

Similarly, the non-rotating seal member 38 is a generally flat, disc-shaped member that is made of silicon carbide. The non-rotating seal member 38 has an opening 39 through the center thereof defining an annular seal surface 38a corresponding in size and shape to seal surface 36a. The interfacing seal surfaces 36a and 38a of the seal members are lap ground to define closely fitting surfaces when the seal surfaces of the two seal members are engaged in abutting relationship.

The non-rotating seal member 38 is mounted on and secured to a carrier 40. The carrier 40 is a generally hollow cylindrical sleeve-shaped member having a sidewall portion 76 with a flange 77 at one end 78 formed with an annular shoulder 79. The carrier 40 is countersunk at its inner edge 78 defining a recess 80 which locates the seal member 38. A plurality of key slots 81 are defined along the periphery of the carrier. The key slots are aligned with corresponding apertures 82 in the end cap 30. Roll pins 83 pass through the key slots and into the apertures to index the seal member carrier 40 to the end cap 30 for preventing rotation of the carrier 40, and the seal member 38 carried thereby, relative to the end cap 30 when the seal member 38 is in engaged by the rotating seal member 36.

The edge of the carrier 40 at its opposite end 84 is bevelled radially outwardly, defining an annular trough or channel 85 between the circumferential end 84 of the carrier 40 and the inner surface 37b of the side wall 37 of the end cap. The non-rotating seal member 38 and the carrier 40 are dimensioned and mounted aligned with the axis of the passageway 42 so as to be capable of sliding axial motion within the passageway toward and away from the rotating seal member on the stub rotor 18.

For the purpose of maintaining the non-rotating seal member 38 out of engagement with the rotating seal member 36 in the absence of coolant pressure, a compression spring 86, embodied as a coil spring, is located in the seal chamber 35. The compression spring encircles the stub rotor and the carrier 40 and is located between the shoulder 79 of the carrier and the inner surface 87 of the end wall 52 of the union adapter 20. The force of the compression spring is transmitted rearwardly, to the right in FIG. 2, against the end 78 of the carrier 40. In the exemplary embodiment, the compression spring is made of stainless steel.

The sealing arrangement 33 provided by the present invention prevents leakage forwardly of the carrier 40 through the gap 88 between the outer surface 76a of the carrier side wall 76 and the inner surface 37b of the end cap into the seal chamber. The sealing arrangement 33 includes an annular sealing member 89 and a back-up ring 90. The annular sealing member 89 is embodied as a VITON O-ring which is positioned in an annular groove 91 formed in the inner surface of the end cap side wall 37 and seats on the carrier 40. In the exemplary embodiment, the outer diameter of the O-ring seal is 5 millimeters.

Referring to FIGS. 2, 4 and 5, the back-up ring 90 is an annular member is made of a rigid material, such as NYLON. The back-up ring has a generally triangular cross-section. The back-up ring has an opening 92, the inner diameter of which corresponds to the outer diameter 76a of the carrier 40. The back-up ring has an annular rear surface 93 and a forward surface 94 that slopes or slants radially outward from edge 95 of the opening 92 to the peripheral edge 96 of its rear surface 93. The back-up ring 90 is mounted on the carrier 40, extending around the circumference of the carrier, and with its slanting surface extending into the annular groove 91.

Referring to FIGS. 2 and 3, in the exemplary embodiment, the annular groove 91, which is rectangular in shape, has a radial dimension "a" of approximately 5.5 millimeters between the outer surface 76a of the carrier side wall 76 and the outer wall 100 of the annular groove 91 and a circumferential dimension "b" of approximately 6 millimeters between opposing parallel extending end walls 98 and 99 of the groove 91. Thus, the axial length and depth of the groove 91 is greater than the diameter of the O-ring seal. As shown in FIG. 3, the O-ring seal 89 is dimensionally smaller than the annular seal compartment, allowing the O-ring seal to float within the groove 91 as the carrier is moved axially forwardly, in moving the non-rotating seal member into engagement with the rotating seal member, and backwardly, in moving the non-rotating seal member out of engagement with the rotating seal member.

Referring to FIGS. 1–3, when liquid coolant is supplied through the coolant union 10 to a device, such as a rotating drill bit, connected to and rotated by the shaft 12, the fluid inlet 42 of the coolant union is connected by the conduit 28 to the source 11 of liquid coolant under pressure which is to be conducted through the rotating union to the device with which the rotating union is associated. Initially, the non-rotating seal member 38 is maintained out of engagement with the rotating seal member 36 by the force of the restoring spring. In such condition, the O-ring seal 89 and the back-up ring 90 are, preferably, all located in contact with the one another away from end wall 99 of the groove 91, as shown in FIG. 3. When liquid coolant is supplied to the fluid inlet and thus flows into the passageway 42, a portion of the pressurized coolant is directed to the peripheral edge of the carrier, entering the trough 85, applying a force to the carrier. When the flow pressure of the liquid coolant becomes sufficient to overcome the bias force of the compression spring, the carrier 40 is moved by the force of the coolant flow to the operated or pressurized condition, i.e., to the left in FIG. 2, moving the non-rotating seal member 38 into engagement with the rotating seal member, as illustrated in FIG. 6. When in the operated, pressurized condition, the coolant flows through the passageway 42 in the end cap 30, through the contacting seal members 36 and 38 of the floating seal assembly 32 and through the bore 17 in the stub rotor 18 to the rotating device to which coolant is to be supplied. As shown in FIG. 7, when the carrier is moved to the operated engaging position, the O-ring seal 89 is moved into engagement with the slanting surface 94 of the back-up ring 90 and with the end wall 99 of the annular groove 91, as shown in FIG. 7. The triangular shaped back-up ring 90 fills the space in the corner between the circular cross-sectioned O-seal ring 89 and the right angle adjacent walls 99 and outer surface 76a of the carrier side wall 76 within the groove 91.

The non-rotating seal member 38 is maintained in engagement with the rotating seal member 36 as long as fluid flow pressure is maintained through the coolant union. When fluid pressure decreases to a value which is insufficient to overcome the force of the compression spring, the carrier 40 is moved under the force of the compression spring moving the seal member 38 out of engagement with the rotating seal member 36, returning the coolant union to the unoperated, unpressurized condition, to the position as shown in FIG. 2. The O-ring seal member 89 is moved by the carrier back towards the end wall 98 to the position shown in FIG. 3.

Thus, it has been shown that the present invention provides an improved sealing arrangement for preventing leakage forward between a portion of a seal assembly that is adapted for axial sliding movement within a throughbore of a housing and the inner wall of the housing of the coolant union along which the seal assembly portion slides. The seal arrangement includes an O-ring seal member located in an annular groove defined in the housing inner wall and a back-up ring carried by the carrier and extending into the groove. The O-ring seal is sized to be smaller than the annular groove. The back-up ring defines a slanting surface which faces the O-ring seal and which is engaged by the O-ring seal during axial movement of the seal assembly for limiting movement of the O-ring. The limited movement of the O-ring seal minimizes wear on the seal, thereby increasing its lifetime.

Additionally, in accordance with the present invention the annular seal member or O-ring is structurally arranged to sealingly engage the outer annular surface of the movable portion of the seal assembly and to float within the annular groove provided in the inner wall of the housing. Thus, as thermal expansion of the spindle or shaft occurs during running of the rotating coolant union, this thermal expansion effects the preset opening distance between the rotating and non-rotating seal faces. Under such conitions, the O-ring never rolls on the movable portion of the seal assembly but instead is allowed to slide or float within the annular groove to provide an automatic adjustment for spindle expansion to maintain the preset opening distance and avoid contact during a dry running condition.

While the invention has been described with reference to preferred embodiments, various modifications can be made without departing from the spirit and scope of the invention as defined in the appended claims. For example, although the sealing arrangement is described with reference to an application in a fluid coupling device, and in particular a rotating coolant union, the sealing arrangement can be used in other applications in which sealing is required between first and second relatively movable members. Also, although in the exemplary embodiment, the annular groove is formed in the wall of the housing, the groove can be formed in the peripheral surface of the carrier and the inner surface of the housing can define a back-up surface that extends into such groove for controlling movement of the seal member.

What is claimed:

1. In a fluid coupling device including a housing having a fluid inlet, a fluid outlet, and a fluid passageway through said housing which communicates said fluid inlet with said fluid outlet, said fluid passageway defining an inner surface for said housing; and a seal assembly located within said fluid passageway and including a cylindrical seal support member having an outer surface engaging said inner surface of said housing, said seal support member being adapted for axial sliding movement within said fluid passageway along said inner surface of said housing; a sealing arrangement for substantially preventing leakage forward of said seal assembly between said engaging surfaces of said support member and said housing, said sealing arrangement comprising:

an annular seal member located in an annular groove defined in said inner surface of said housing, said seal member sealingly engaging the cylindrical seal support member;

the width of said annular groove in a direction axially of said fluid passageway being greater than the outer diameter of said seal member and with the depth of said annular groove in a direction radially of said fluid passageway being greater than the outer diameter of said seal member which permits said seal member to axially translate within said groove in response to axial sliding movement of said support member within said fluid passageway; and an annular back-up ring encircling said seal support member, said back-up ring having a radially projecting portion extending into said groove, said projecting portion of said back-up ring defining a slanting surface for a corner of the groove and the seal support member, the slanting surface of said back-up ring facing said annular seal member and being engaged by said seal member during relative axial movement during fluid pressurization of said seal support member between said seal support member and said housing for limiting the movement of said annular seal member within said groove to provide a seal between the support member add the housing during fluid pressurization.

2. The fluid coupling device according to claim 1, wherein said back-up ring is generally triangular in cross section.

3. The fluid coupling device according to claim 1, wherein said annular groove has first and second parallel sides which are spaced apart in a direction axially of said fluid passageway, and wherein said annular seal member engages a side of said groove when said support member is at said actuated engaging position to provide a seal therebetween and floats within said groove when said support member is at said unactuated disengaged position.

4. The fluid coupling device according to claim 1, wherein said back-up ring has a central opening to facilitate the mounting of said back-up ring on said support member, the inner diameter of said opening being greater than the outer diameter of said support member to permit said back-up member to float on said support member.

5. The fluid coupling device according to claim 1, wherein said annular seal member is an O-ring seal.

6. The fluid coupling device according to claim 5, wherein said groove is rectangular in cross-section and said seal member is circular in cross section, whereby a space is provided between adjacent sides of said groove and said seal member, said space being substantially filled by said projecting portion of said back-up ring when said support member is in said second position.

7. The fluid coupling device according to claim 5, wherein the difference between said width of said groove and said outer diameter of said O-ring seal is approximately one millimeter.

8. In a rotating union including a housing having a fluid inlet, a fluid outlet and a fluid passageway communicating said fluid inlet with said fluid outlet, said fluid passageway defining an inner surface for said housing; a rotor adapted for coupling to a rotating device, said rotor having a discharge outlet extending axially therethrough and being supported with said discharge outlet in fluid communication with said fluid outlet of said housing for supplying fluid conducted through the rotating union to said rotating device; and a rotating seal assembly located in said fluid passageway for providing a rotating seal between said fluid outlet of said housing and said discharge outlet of said rotor, said rotating seal assembly including a cylindrical seal support member having an outer surface engaging said inner surface of said housing, said support member being adapted for sliding axial movement along said inner surface of said housing between first and second positions; a sealing arrangement for substantially preventing leakage forward past said support member of said rotating seal assembly between said engaging surfaces of said support member and housing, said sealing arrangement comprising:

an annular seal member mounted on said support member and located in an annular groove formed in said inner wall of said housing, with the depth of said annular groove and the width of said groove in a direction axially of said fluid passageway being greater than the outer diameter of said annular seal member which permits said seal member to axially translate within said groove in response to axial sliding movement of said support member within said fluid passageway as said support member is driven between a first at rest disengaged position and a second actuated engaging position; and an annular back-up ring on said support member, said back-up ring having a radially projecting portion extending into said groove, said seal member being moved into engagement with said projecting portion in response to said support member being driven from said first to said second position, whereby said back-up ring limits movement of said seal member within said groove as said annular support member is driven to said second position.

9. The rotating union according to claim 8, wherein said back-up ring is generally triangular in cross section and said radially projecting portion defines a slanting surface which is engageable with said annular seal member.

10. The rotating union according to claim 8, said annular groove has first and second parallel sides which are spaced apart in a direction axially of said fluid passageway, and wherein said seal member engages said first side of said groove when said support member is at said second actuated position to provide a seal therebetween and floats within said groove when said support member is at said first at rest position.

11. The rotating union according to claim 8, wherein said back-up ring has a central opening to facilitate the mounting of said back-up ring on said support member, the diameter of said opening being greater than the outer diameter of said support member to permit said back-up member to float on said support member.

12. The rotating union according to claim 8, wherein said seal member is an O-ring seal.

13. The rotating union according to claim 12, wherein said groove is rectangular in cross-section and said seal member is circular in cross section, whereby a space is provided between adjacent sides of said groove and said seal member, said space being substantially filled by said projecting portion of said back-up ring when said support member is in said second position.

14. The rotating union according to claim 12, wherein the difference between said width of said groove and said outer diameter of said O-ring seal is approximately one millimeter.

15. In a rotating union including a housing having fluid inlet chamber, a rotor adapted for coupling to a rotating device for supplying liquid conducted through the rotating union to said rotating device, said rotor having a discharge passageway extending axially therethrough, and sealing means providing a rotating seal between said fluid inlet chamber and said discharge passageway; said sealing means including a rotating seal member, a non-rotating seal member, and a support member, said rotating seal member being mounted on said rotor to rotate with the rotor, said rotating seal member having a seal surface; said non-rotating seal member being located in the inlet chamber and having a seal surface opposing said seal surface of said rotating seal member, said support member supporting said non-rotating seal member for movement within said inlet chamber axially of said housing between a first position in which said seal surface of said non-rotating seal member is spaced apart from said seal surface of said rotating seal member and a second position in which said seal surface of said non-rotating seal member engages said seal surface of said rotating seal member; a sealing arrangement for preventing leakage forward through the gap between said inner surface of said housing and said support member comprising:

an annular seal member located in a groove formed in said inner wall of said housing, the width of said groove in a direction axially of said fluid passageway and the depth of said annular member in a direction radially of said fluid passageway being greater than the outer diameter of said seal member which permits said seal member to axially translate within said groove in response to axial sliding movement of said support member within said fluid passageway as said support member is driven between said first and second positions; and an annular back-up ring encircling said support member, said back-up ring having a radially projecting portion extending into said groove and defining a slanting surface for a corner of said groove, said seal member being moved into engagement with said slanting surface in response to said support member being driven from said first position to said second position, whereby said back-up ring limits movement of said seal member within said groove as said support member is driven to said second position.

* * * * *

UNITED STATES PATENT AND TRADEMARK OFFICE
CERTIFICATE OF CORRECTION

PATENT NO. : 5,617,879
DATED      : April 8, 1997
INVENTOR(S): Zbigniew Kubala

It is certified that error appears in the above-indentified patent and that said Letters Patent is hereby corrected as shown below:

Column 8, line 67 delete "add" insert -- and --;

Signed and Sealed this

Twenty-third Day of September, 1997

*Attest:*

BRUCE LEHMAN

*Attesting Officer*  *Commissioner of Patents and Trademarks*